United States Patent [19]

Boutaud et al.

[11] Patent Number: 5,182,795
[45] Date of Patent: Jan. 26, 1993

[54] PROCESS AND DEVICE FOR GRAPHICALLY DRAWING POINT BY POINT A CLOSED CURVE OF THE SECOND ORDER

[75] Inventors: Frederic Boutaud, Roquefort-les-Pins; Gerard Chauvel, Antibes, both of France

[73] Assignee: Texas Instruments Incorporated, Dallas, Tex.

[21] Appl. No.: 168,711

[22] Filed: Mar. 16, 1988

[51] Int. Cl.$^5$ ............................................. G06F 15/20
[52] U.S. Cl. ..................................................... 395/142
[58] Field of Search .................. 364/518–522; 340/721, 723, 729, 747, 750, 798, 799, 800

[56] References Cited

U.S. PATENT DOCUMENTS

4,674,059  6/1987  Schrieber ............................ 364/523
4,680,578  7/1987  Hornig et al. ....................... 340/731

*Primary Examiner*—H. A. Herndon
*Attorney, Agent, or Firm*—William E. Hiller; Richard L. Donaldson

[57] ABSTRACT

A device including a screen memory (53) for storing the data relating to the points of a screen on which the curve is to be drawn. A point processor (21) modifies the data stored in the screen memory (53) at the positions of said screen memory corresponding to the points of the curve to be drawn. An address processor (20) adapted to control the access to the screen memory (53), the operation of the processor (21) and the transfers of data between the point processor (21) and the screen memory (53) so as to ensure the modification of its content as a function of the line to be drawn. A CROM memory (22) containing instructions relating to the changing of the reference of U, V relative coordinates of each octant change and instructions relating to the point by point drawings of portions of curves contained in each of the octants covered by the arc of a curve to be drawn.

6 Claims, 8 Drawing Sheets

PROCESS AND DEVICE FOR GRAPHICALLY DRAWING POINT BY POINT A CLOSED CURVE OF THE SECOND ORDER

The present invention relates to the drawing of curves on a graphical screen, such as for example a cathode ray tube screen, and more particularly relates to the drawing of closed curves of the second order.

The devices described in French patents 84 10,376 and 84 10,377 of which the Applicant is the proprietor, permit creating, modifying and displaying graphical images on the screen of a cathode ray tube.

The conventional processes for drawing circles are based on processes for drawing graphical primitives by iterative and incremental methods based on the works of Bressenham.

These methods permit the drawing of arcs of a curve but require the drawing of a complete circle in eight arcs of a circle, either by positioning a drawing cursor eight times or by using eight cursors and drawing the circle by symmetries.

An object of the invention is to provide a process and a device for drawing closed curves of the second order by using the technique described in the aforementioned documents so as to draw such curves, and in particular circles, on a graphical image in a manner more effective than that permitted by the conventional processes developed up to the present time from the algorithm of Bressenham.

The invention more particularly aims at creating a process for drawing a complete closed curve of the second order with a single cursor continuously travelling through the perimeter of the curve to be obtained.

The invention therefore provides a process for graphically drawing point by point at least one arc of a closed curve of the second order, comprising:

dividing the plane intended to contain the arc of the curve into octants by taking perpendicular X, Y axes as fixed coordinates, determining the number of octants which the arc of a curve must cover, determining for the first octant as a function of the slope of the tangent to the curve at the origin point of the arc to be drawn and of the direction of displacement on the curve a U axis of larger movement or director axis, and a V axis of smaller movement or secondary axis, the director and secondary axes U, V forming a reference of relative coordinates for said octant, drawing the arc of a curve in the first octant by an iterative point by point drawing process in using the reference of relative coordinates, characterized by:

taking as the origin of the curve to be drawn in the second octant the last point of the curve in the first octant, determining for the second octant, as a function of the slope of the tangent to the curve as this new origin point and of the direction of travel along the curve, a new U, V reference of relative coordinates for the second octant, calculating the initial values of the drawing of the curve in the second octant from the final values of the octant, drawing the arc of a curve in the second octant by an iterative point by point process in using the new reference of relative coordinates, recommencing the operations for determining the reference of relative coordinates and drawing in all the octants covered by the arc of a curve.

The invention also provides a drawing device for carrying out the process defined hereinbefore, characterized in that it comprises a screen memory for storing the data relating to the points of a screen on which the curve must be drawn, a point processor adapted to modify the data stored in the screen memory at the positions of said screen memory corresponding to the points of the curve to be drawn, an address processor adapted to control the access to the screen memory, and to carry out the calculations required for the evolution of the iterative and incremental algorithm, the operation of the point processor and the transfers of data between the point processor and the screen memory so as to ensure the modification of its content as a function of the curve to be drawn, a CROM memory containing instructions relating to the changing of the U,V reference relative coordinates for each octant change and instructions relating to the point by point drawings of portions of curves contained in each of the octants covered by the arc of a curve to be drawn.

According to a particular feature of the invention, the drawing device further comprises a multiplexer of addresses associated with the CROM memory, an instruction register for receiving and transferring to the CROM memory instructions relating to a curve to be drawn and a counter of the direction of the curve drawn in the various octants covered by the curve to be drawn, said direction counter being controlled by the octant changing instructions contained in said CROM memory.

According to another feature of the invention, the device further comprises means for determining the sign of the slope of the tangent to the curve at the origin point of the arc of a curve to be drawn in each octant, and octant changing control means, said sign determining means and octant changing control means being associated with a unit for the arithmetic and logical processing of the content of the registers of said address processor as a function of the instructions from the CROM memory.

According to a further feature of the invention, the device further comprises means for determining the SGN sign of a decision criterion in the drawing algorithm and adapting the decision criterion as a function of the drawing octant for obtaining perfectly symmetrical curves.

According to another feature of the invention, the device further comprises means for controlling access to data to the point processor in two directions controlled by said CROM memory for introducing in the storage cells of said point processor data relating to the modification of data of the screen memory as a function of the line to be drawn and an arithmetic and logic unit also controlled by the CROM memory for effecting on data introduced in the network of storage cells of the point processor, the operations required for the modification of the data of the screen memory for the purpose of transferring to corresponding places of said screen memory the data modified as a function of the line to be drawn.

According to a further feature of the invention, the device further comprises a color register adapted to associate with each point of the line to be drawn introduced in the screen memory after processing by the point processor, color modification data to permit the operations for displaying the line from the content of said screen memory modified in accordance with the line to be drawn.

A better understanding of the invention will be had from the following description given solely by way of example with reference to the accompanying drawings in which.

Before proceeding to the description of the invention, there will be given hereinafter a description of a drawing of a curve based on the aforementioned iterative and incremental methods.

Figure 1:
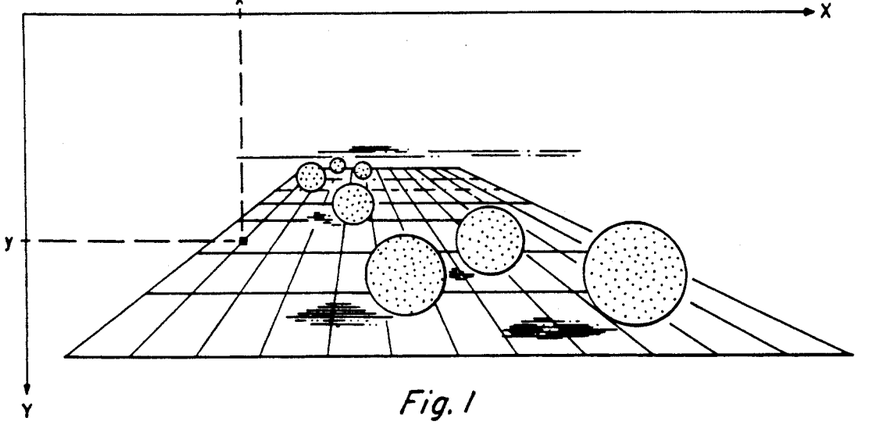
FIG. 1 is a simple graphical image in which the points are located by X and Y coordinates.

A graphical image on an XY display device is formed by equidistant lines of colored pixels or points. If the coordinate axis X defines the position of the point in the line (horizontal axis) and the coordinate axis Y defines the position of this line within a frame (vertical axis), the center of a colored point is defined by two integers x and y. The X, Y axes represent the two dimensions of the display screen and form the absolute coordinate reference of the system. FIG. 1 shows a simple graphical image and represents the X axis as a horizontal axis extending from the left to the right, and the Y axis as a vertical axis extending from the top to the bottom of the screen.

Owing to the essentially discrete nature of a graphical image, the representation of a curve can only be an approximation of the real curve. With the methods of the Bressenham type, an arc of a curve is drawn by modifying the color of the points which are located the closest to the theoretical curve. This modification is effected in an iterative manner, point by point, by travelling along the arc from one end to the other end of the theoretical curve.

The drawing of an arc of a curve employs the following notions:

direction of the drawing, director axis, secondary axis.

The direction of the drawing is defined by the slope of the tangent to the curve and by the direction of travel along the curve. As a function of these two parameters, there are associated with the direction: the axis of the largest movement (termed U axis or director axis), and the axis of the smallest movement (termed V axis or secondary axis). These axes may be:

X oriented positively, X+
X oriented negatively, X−
Y oriented positively, Y+
Y oriented negatively, Y−

All of the U and V axes form a reference of relative coordinates.

Figure 2:
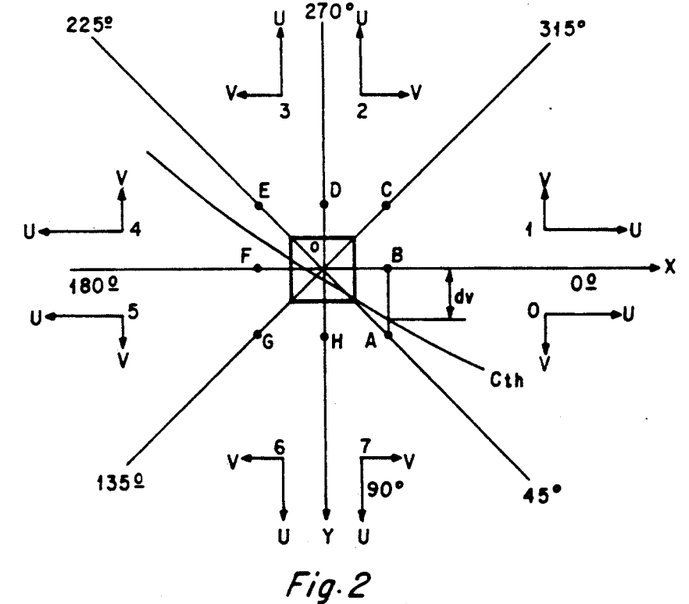
FIG. 2 is a diagram of a display region divided into eight octants around an orgin point on which eight line directions are marked.

FIG. 2 shows a display region on which are marked eight line directions, and the X, Y axes and the U, V axes for each of the directions. The following table indicates the relations between directions, slope of the tangent and U, V axes.

TABLE

| DIRECTION | 0 | 1 | 2 | 3 | 4 | 5 | 6 | 7 |
|---|---|---|---|---|---|---|---|---|
| RELATION U AXIS | U=X | U=X | U=−Y | U=−Y | U=−X | U=−X | U=Y | U=Y |
| RELATION V AXIS | V=Y | V=−Y | V=X | V=−X | V=−Y | V=Y | V=−X | V=X |
| SEGMENT SLOPE ANGLE (in degrees) from | 0 to 45 | 45 to 90 | 90 to 135 | 135 to 180 | 180 to 225 | 225 to 270 | 270 to 315 | 315 to 0 |

In FIG. 2, there has been plotted the point O assumed to be the point drawn in the step in process of being carried out of the iterative drawing sequence. From the point O taken as an origin, the plane is divided into eight octants defined by the fixed orthogonal coordinate axes X, Y and by the two bisectors of the angles they form. This point O has eight immediate neighbors, the points A, B, C, D, E, F, G, H located on the limits of the aforementioned eight octants. The point modified in the following step is a function of the tangent to the curve at point O. If for example the slope is between 0° and 45° (direction O), the next point drawn will be either A or B. The choice between A and B must be made as a function of the position of the theoretical curve arc Cth with respect to these two points: if the distance dv between the point B and the point at which the theoretical curve intersects the segment AB is less than 0.5 AB, the point B must be chosen. If this distance is larger than 0.5 AB, the point A must be chosen. If dv is equal to 0.5 AB, either A or B must be chosen in an arbitrary manner.

Thus, the iterative drawing algorithm must maintain a criterion of decision translating the comparison of the distance dv with the value 0.5 AB which is in fact equal to 0.5 since the points A and B are located on lines whose spacing is equal to unity, and permitting the choice of the best approximation of the theoretical curve. In the case of a theoretical curve of the second order, the polynomial equation of the curve with respect to the relative reference of the U, V axes, is written for a point of coordinates (u, v) placed on the curve:

$$G(u,v) = a\ U^2 + b\ v^2 + c\ u\ v + d\ u + e\ v + k = 0 \quad (1)$$

If the point (u, v) is not located exactly on the curve, there exists a distance dv such that $$G(U, v + d\ v) = 0 \quad (2)$$

It can be deduced from equations (1) and (2) that the sign of the expression T (u, v) mentioned below is the reflection of the comparison of dv relative to 0.5.

$$T(u,\ v) = 2a\ u^2 + 2b\ v^2 + 2c\ u\ v + (2d + c)\ u + 2(b + e) v + 2k + e \quad (3)$$

In the case where G (u, v) is negative, "T (u, v) positive" indicates that dv is greater than 0.5.

Figure 3:
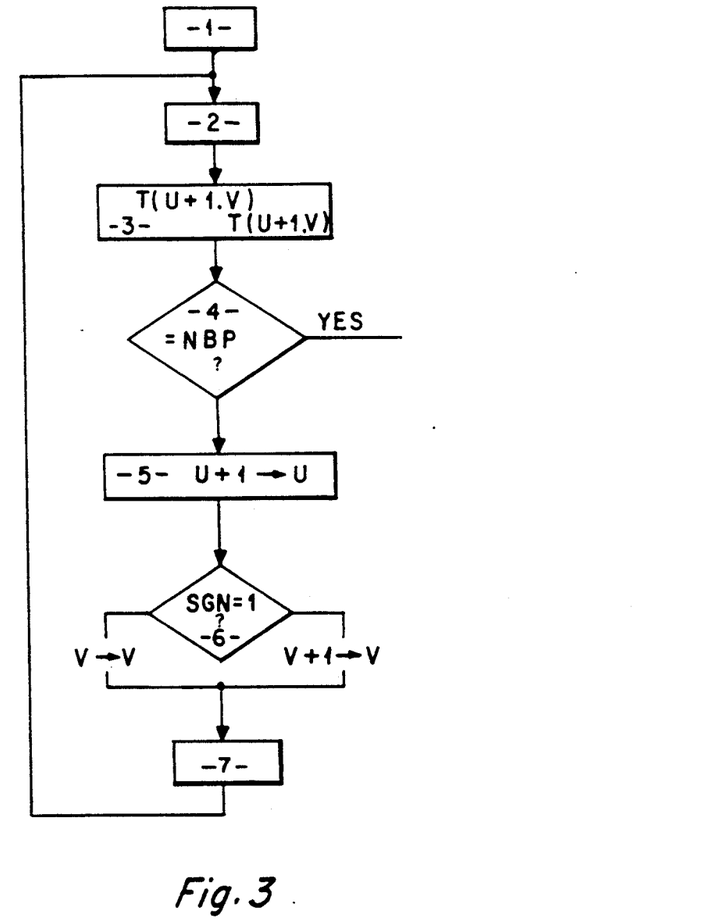
FIG. 3 is a flow chart of the sequence of the drawing of an arc of a curve.

A flow chart of the sequence of the drawing of an arc of a curve is illustrated in FIG. 3.

Figure 4:
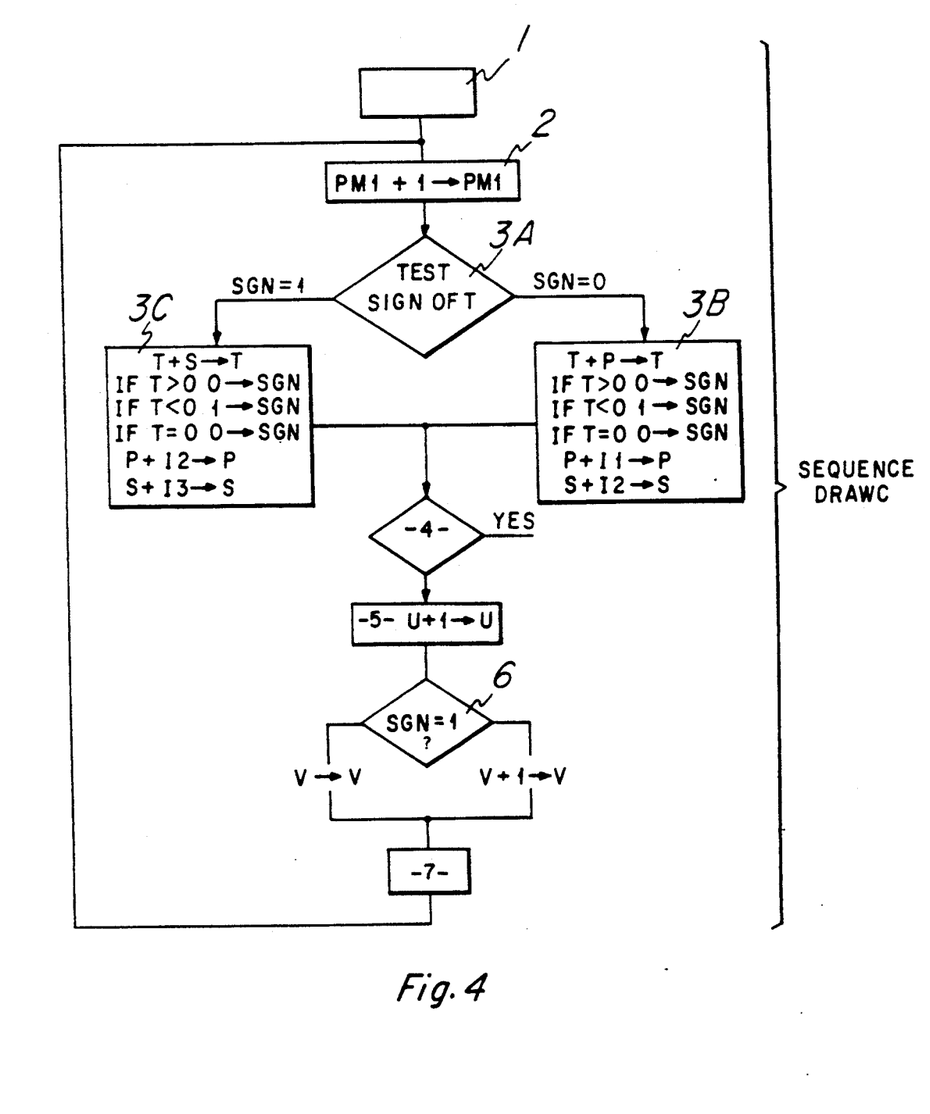
FIG. 4 is a complete flow chart of the drawing of an arc of a curve of the second order.

The flow chart of FIG. 4 is the same as that of FIG. 3 but shows the detail of the calculation of T (u+1, v). This sequence termed DRAWC uses the following variables:

T: decision equation
SGN: sign, decision criterion
P: increment of order 2 according to the coordinate U
S: increment of order 2 according to the coordinate v
I1: increment of order 1
I2: increment of order 1
I3: increment of order 1
PM1: loop counter
PM2: number of points to be drawn Referring to FIG. 3, in the course of the initialization step 1, there are determined the position (u, v) of the coordinates of the cursor, drawing direction DIR, the number of points NBP, and the position of the loop counter PM1=0.

In the course of step 2, there is incremented the loop counter PM+1→PM1.

In the course of step 3, there is calculated T (u+1, v) and the sign SGN of T (u+1, v) is established.

In the course of step 4, it is determined whether the content of the loop counter is equal to the number NBP of points to be drawn.

If the content of the loop counter is equal to the number NBP of points to be drawn, the drawing is terminated.

If the content of the loop counter is not equal to the number NBP of points to be drawn, the cursor is shifted U+1→U in the course of step 5.

In the course of step 6, it is checked whether the sign SGN=1.

If the sign SGN=1, then v+1→v
If the sign SGN does not equal 1, then v→v

In the course of step 7, the point chosen by the cursor is drawn, and the procedure returns to step 2 for the purpose of repeating the calculation sequence for determining the next stage of the drawing.

In the flow chart of FIG. 4, the step 3 of the calculation of T (u+1, v) comprises a step 3A for testing the sign of T which occurs immediately after step 2 involving the incrementation of the loop counter.

If the sign SGN=0, one proceeds in the course of step 3B to the establishment of the values:

T+P→T by incrementation according to the coordinate U

If T>0 0→SGN

If T<0 1→SGN

If T=0 0→SGN

P+I1→P

S+I2→S

If the sign SGN=1, one proceeds in the course of step 3C to the establishment of the values:

T+S→T by incrementation according to the coordinate V

If T>0 0→SGN

If T<0 1→SGN

If T=0 0→SGN

P+I2→P

S+I3→S

At the end of step 3B or 3C, the interrogation step 4 and the subsequent steps 5, 6 and 7 described with reference to FIG. 3 are performed.

A conventional process for drawing a circle will now be described with reference to FIG. 5.

According to this conventional process, a circle is drawn by using a sequence DRAWC of drawing an arc of a curve described with reference to FIGS. 3 and 4, by positioning the cursor eight times for drawing the arcs of each of the eight octants: $M_1-N_1$, $M_2-N_1$, $M_2-N_2$, $M_3-N_2$, $M_4-N_3$, $M_4-N_4$, and $M_1-N_4$.

Figure 5:
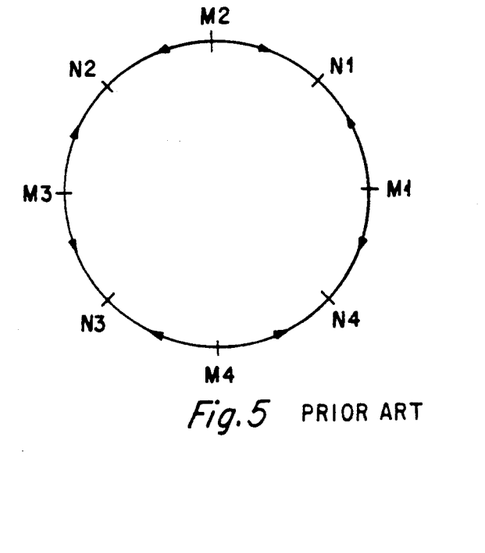
FIG. 5 is an image of a circle drawn in accordance with a conventional process.

In FIG. 5, the arrows placed in each of the octants indicate the corresponding directions of the lines to be drawn for producing the various arcs of a circle.

The aforementioned line may also be drawn by using a plurality of cursors and creating the arcs by symmetries.

Figure 6:
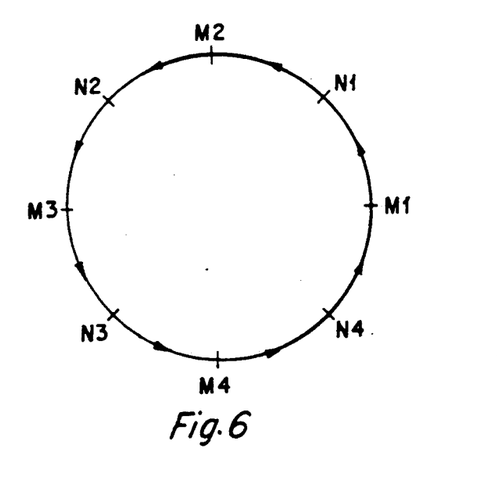
FIG. 6 is an image of a circle drawn in accordance with the process of the invention.

According to the process of the invention, the drawing of a circle is achieved as shown in FIG. 6 in a continuous manner, octant after octant, starting at $M_1$ and passing in succession always in the same direction through $N_1$, $M_2$, $N_2$ and so on until one returns to $M_1$.

Figure 7:
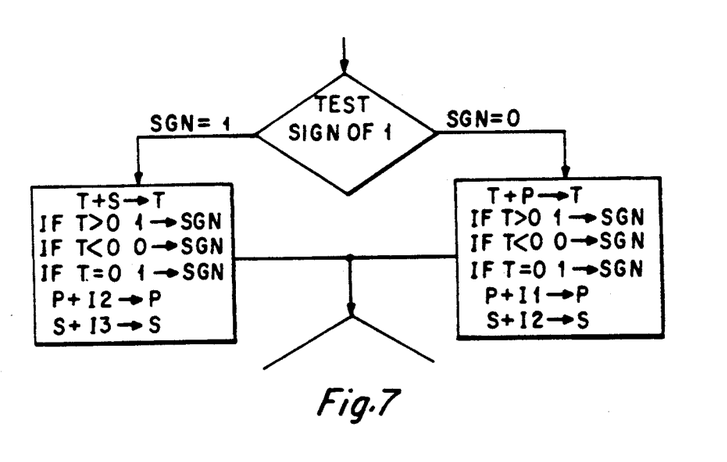
FIG. 7 is a flow chart of a detail of the calculation of T(U, V) for a drawing sequence DRAWCI.
Figure 8:
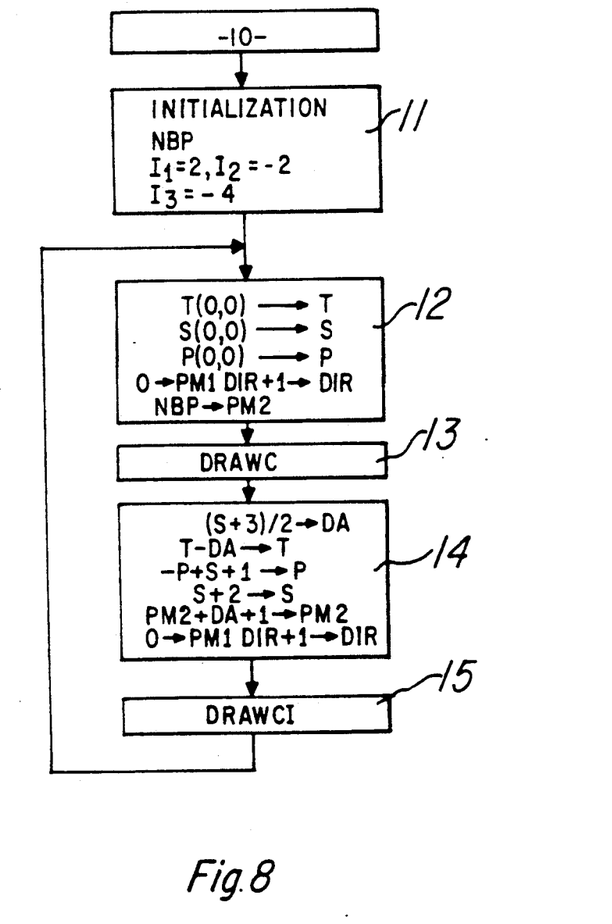
FIG. 8 is a flow chart of the technique of a circle in a continuous manner in accordance with the process of the invention.

Such a process in which the arcs contained in the successive octants are always passed through in the same direction, may be achieved by means of the flow charts shown in FIGS. 7 and 8.

The flow chart shown in FIG. 8 solves the problem of the passage from the final values obtained after drawing an arc of a circle, to the initial values necessary for the drawing of the following arc of a circle. It also solves the problem of the symmetry of the curve which must be perfect relative to the horizontal and vertical axes but also relative to the diagonal axes at 45° and 135°.

To obtain a symmetrical circle, the arcs of a circle are drawn alternately either with the sequence DRAWC or with the sequence DRAWCI. The sequence DRAWCI differs from the sequence DRAWC solely by the generation of the decision criterion SGN which, as can be seen in FIG. 7, is the inverse of that of the sequence DRAWC shown in FIG. 4. Another manner of proceeding is to always use the same sequence of the drawing of an arc, but to render the generation of SGN dependent on an external variable DRC which varies alternately for each arc drawn. It is this method described by the flow chart of FIG. 10 which will be employed hereinafter.

The flow chart of FIG. 8 comprises a step 10 for placing in position the cursor at $M_1$ which is the origin of the curve. This step is followed by an initialization step 11 in the course of which the values NBP, $I_1 = -2$, $I_2 = -2$, $I_3 = -4$ are established.

In the course of the following step 12, there are calculated the values $T(0, 0) \rightarrow T$ $S(0, 0) \rightarrow S$ $P(0, 0) \rightarrow P$ $0 \rightarrow PM1$ $DIR + 1 \rightarrow DIR$ $NBP \rightarrow PM2$ Then, in the course of step 13, one proceeds to the sequence DRAWC of the drawing of the arc of a circle.

In the course of step 14, there are established the values $(S+3)/2 \rightarrow DA$ $T - DA \rightarrow T$ $-P + S + 1 \rightarrow P$ $S + 2 \rightarrow S$ $PM2 + DA + 1 \rightarrow PM2$ $0 \rightarrow PM1$, $DIR + 1 \rightarrow DIR$ for the purpose of carrying out step 15 corresponding to a sequence DRAWCI for drawing the following arc of a circle.

The procedure then returns to step 12 for effecting the calculations required for effecting a following sequence DRAWC.

Figure 9:
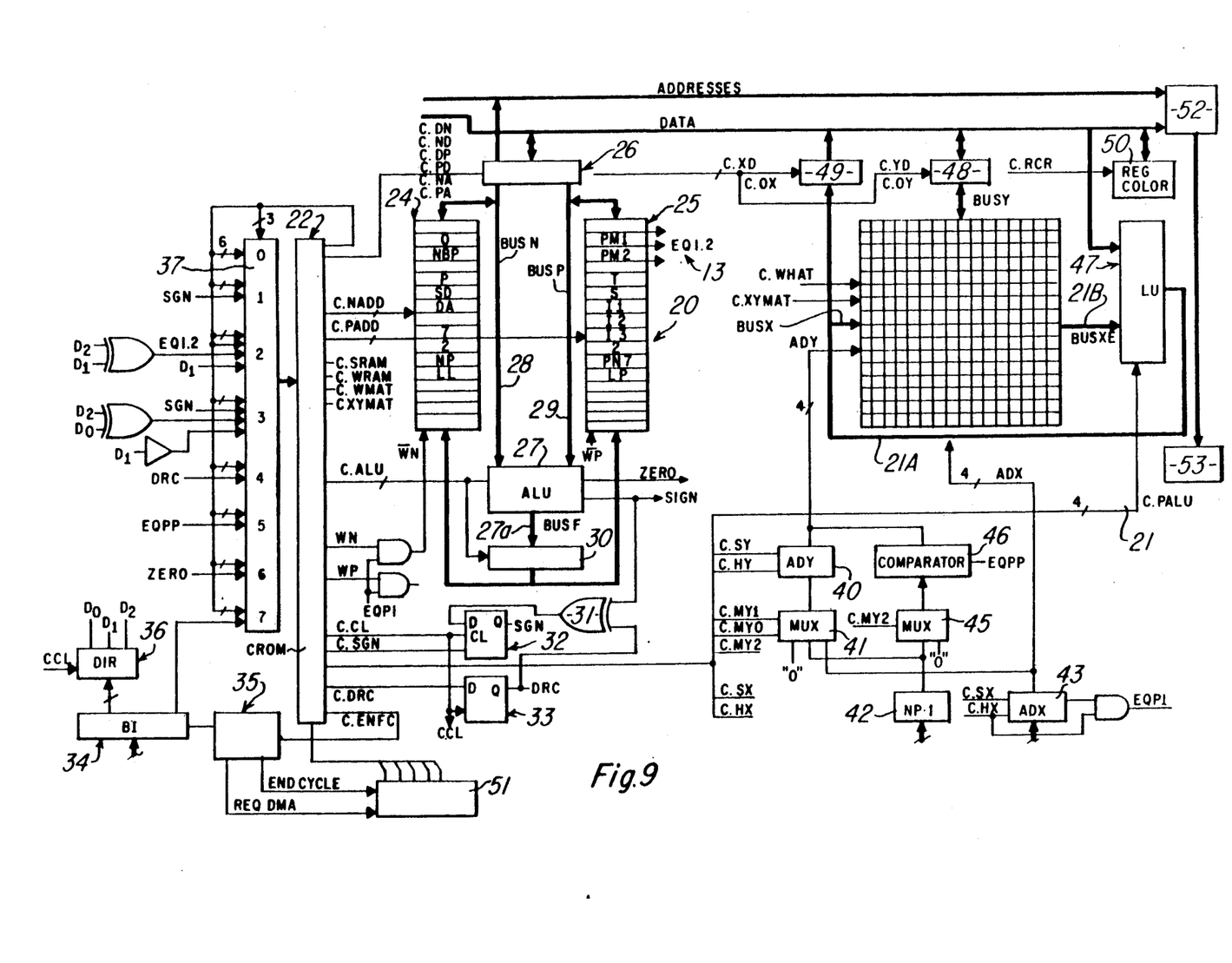
FIG. 9 is a block diagram of a circle drawing device for carrying out the process of the invention.

The device for drawing a circle according to the process of the invention is shown in FIG. 9.

It comprises an address processor designated by the general reference character 20, a point processor designated by the general reference character 21 and a CROM memory 22 adapted to control the operation of these two processors.

The CROM 22 contains in particular the data relating to the different directions U, V to be adopted for the drawing of portions of a curve in each of the octants covered by the curve.

The address processor 20 comprises two stacks N and P of registers 24, 25 used as pointers of access to a screen memory or as increment or calculation variables. The registers 24 and 25 are connected, on one hand, to a transfer register 26 which is connected to an address bus and to a data bus and, on the other hand, to an arithmetic and logic unit 27 by means of buses N and P 28 and 29. The arithmetic and logic unit 27 is moreover connected to a left shift register 30 which may be employed for effecting a division by two.

The arithmetic and logic unit 27 and the offset register 30 are controlled by the CROM 22 which is also connected to the transfer register 26.

The arithmetic and logic unit 27 comprises a sign output connected to the input of an EXCLUSIVE OR gate 31 whose output is connected to the input D of a flip-flop SGN 32 storing the sign of T connected to the CROM 22. Another flip-flop 33 intended for the choice of the calculation to be effected for changing an octant is connected, on one hand, to the other input of the gate 31 and, on the other hand, to the CROM 22.

A register BI 34 is adapted to be loaded with a code corresponding to the drawing of a curve and is connected to a central processing unit (not shown) or to any other source of data of the drawing of a curve. It is connected to the CROM 22 through an address multiplexer 37.

In the present example, a logic circuit 35 connected on one hand to the register 34 and on the other hand to the CROM 22 is adapted to determine the intervals of time during which the calculations for drawing the curve, which are operations of lower priority than other operations, may be effected by the device.

A direction counter 36 controlled by the signal C-CL for changing the octant is moreover connected to the register 34.

A multiplexer 37 of addresses connected to the register BI 34 is associated with the CROM 22.

The point processor 21 has a matrix of memory elements accessible along two axes X, Y.

A counter ADY 40 is associated with the matrix of the point processor 21 for ensuring access to the matrix through the channel Y. The counter ADY 40 is controlled by clock signals and is associated with a multiplexor 41 connected on one hand to the output of a memory NP-1 42 and on the other hand to a counter ADX 43 having access to the matrix of the point processor 21 through the channel X.

A comparator 46 connected on the one hand to the memory NP-1 42 through a multiplexer 45 and on the other hand to the counter ADY 40, generates the signal EQPP connected to an input of the multiplexer 37 of addresses associated with the CROM 22.

A logic unit LU 47 is associated with the matrix 21 which is moreover connected to the data bus through registers 48 and 49 for writing in X and Y data.

The logic unit 47 is connected to the channel X and performs logic functions between the data bus to which the logic unit 47 is connected and the content of the matrix 21 read through the channel X.

The address processor 20 and the point processor 21 are controlled by microcode bits issuing from the CROM 22.

The addresses of the CROM 22 are generated by the multiplexer 37 which combines the address bits issuing from the output of the CROM 22 with signals issuing from various logic circuits of the drawing device.

The circuit of FIG. 9 further comprises a device 51 controlling dynamic memory access connected to the CROM 22 and controlled by the second plane cycle logic circuit 35. This device 51 has been described in detail in French patents 77 31,140 and 83 03,143 of which the Applicant is the proprietor and will termed hereinafter DMA.

The address and data buses are connected through an interface circuit 52 to a screen memory 53 adapted to contain the data relating to all of the points of a screen on which an image must be displayed. In the case of the drawing of a curve according to the invention, the data contained in the cells of the memory which must participate in the drawing of the curve undergo modifications in the point processor 21 in accordance with instructions contained in the CROM 22 and are processed by the address processor 20 so as to be thereafter again stored in the screen memory and constitute in the latter a virtual image of the curve to be drawn.

DESCRIPTION OF THE MICROCODE BITS AVAILABLE AT THE CORRESPONDING OUTPUTS OF THE CROM 22

The microcodes of the list which follows are designated by an abbreviation followed by numbers designating the number of bits.

Thus, C-JADD5-0 designates the code JADD comprising six bits J5 to J0.

Selection of addresses:

| C-JADD5-0 | J5 | J4 | J3 | J2 | J1 | J0 |
|---|---|---|---|---|---|---|
| C-JMUX2-0 | M2 | M1 | M0 | | | |

The address JADD is generated by the CROM 22. Depending on the value of JMUX, some bits may be replaced so as to choose a microcode as a function of a signal which is applied to the multiplexer 37 that the three bits of JMUX control.

The conditions of selection are the following:

C-JMUX=000 Mnemonic JUNC:

The six bits J0 to J5 generated by the CROM 22 during the microcode in use select the address of the next microcode to be effected.

C-JMUX=001 Mnemonic JSGN:

The address of the next microcode is generated with bits J5 to J1, the bit J0 being replaced by the signal SGN.

| If SGN = 0 | the address is J5 | J4 | J3 | J2 | J1 | 0 |
|---|---|---|---|---|---|---|
| If SGN = 1 | the address is J5 | J4 | J3 | J2 | J1 | 1 |

C-JMUX=010 Mnemonic JC1:

The address of the next microcode is generated with bits J5 to J3.

J2 is replaced by the signal EQ1.2 issuing from the comparison between the registers PM1 and PM2 of the stack 25.

J1 is replaced by the EXCLUSIVE OR between D2 and D1 issuing from the direction counter DIR 36.

J0 is replaced by D1 issuing from the counter DIR 36.

The next address is J5, J4, J3 EQ1.2 (D2X OR D1), D1.

C-JMUX=011 Mnemonic JC2:

The address of the next microcode is generated with bits J5 to J3.

J2 is replaced by the signal SGN.

J1 is replaced by the signal EXCLUSIVE OR between D2 and D0 issuing from the direction counter DIR 36.

J0 is replaced by the complement of D1 issuing from the counter DIR 36.

The next address is J5, J4, J3, SGN, (DR XOR D0), comp.D1.

C-JMUX=100 Mnemonic JDRC:

The address of the next microcode is generated by the bits J5 to J1, the bit J0 being replaced by the signal DRC.

| If DRC = 0 | the address is J5 | J4 | J3 | J2 | J1 | 0 |
|---|---|---|---|---|---|---|
| If DRC = 1 | the address is J5 | J4 | J3 | J2 | J1 | 1 |

C-JMUX=101 Mnemonic JEQPP:

The address of the next microcode is generated by bits J5 to J1, the bit J0 being replaced by the signal EQPP.

| If EQPP = 0 | the address is J5 | J4 | J3 | J2 | J1 | 0 |
|---|---|---|---|---|---|---|
| If EQPP = 1 | the address is J5 | J4 | J3 | J2 | J1 | 1 |

C-JMUX=110 Mnemonic JZERO

The address of the next microcode is generated with bits J5 to J1, the bit J0 being replaced by the signal ZERO issuing from the ALU 27.

| If ZERO = 0 | the address is J5 | J4 | J3 | J2 | J1 | 0 |
|---|---|---|---|---|---|---|
| If ZERO = 1 | the address is J5 | J4 | J3 | J2 | J1 | 1 |

C-JMUX=111 Mnemonic JBI:

The address of the next microcode is generated by bits J5 to J4, the bits J3 to J0 being replaced by the bits BI3 to BI0 of the register BI 34.

The next address is J5 J4 BI2 BI1 BI0

Transfer signals between BUS of the address processor 25:

C-DN

If C-DN=1, the data bus is transferred to the bus N 28 of the address processor 20.

C-DP

If C-DP=1, the data bus is transferred to the bus P 29 of the address processor 20.

C-ND

If C-ND=1, the bus N 28 of the address processor 25 is transferred to the data bus.

C-PD

If C-PD=1, the bus P 29 of the address processor 25 is transferred to the data bus.

C-NA

If C-NA=1, the bus N 28 of the address processor 25 is transferred to the address bus.

C-PA

If C-PA=1, the bus P 29 of the address processor 25 is transferred to the address bus.

C-NADD3-0

The bits NADD3 to NADD0 select one of the sixteen registers of the stack N 24 of the address processor 25.

C-PADD3-0 Register addresses stack P

The bits PADD3 to PADD0 select one of the sixteen registers of the stack P 25 of the address processor 25.

C-ALU3-0

The bits ALU3 to ALU0 select the code of operation of the ALU 27 of the address processor 20.

In the following values, Bus F designates the data present on the bus F 27a connecting the ALU 27 with the shift register 30.

| If ALU3-0 = | 0000 Bus F = bus P |
|---|---|
| | 0001 Bus F = bus N |
| | 0010 Bus F = inverse bus P |
| | 0011 Bus F = inverse bus N |
| | 0100 Bus F = bus P + bus N |
| | 0101 |
| | 0110 Bus F = inverse bus P + bus N |
| | 0111 Bus F = inverse bus N + bus P |

```
1000 Bus F = bus P + 1
1001 Bus F = bus N + 1
1010 Bus F = bus P − 1
1011 Bus F = bus N − 1
1100 Bus F = bus P + bus N + 1
1101
1110 Bus F = inverse bus P + bus N + 1
1111 Bus F = inverse bus N + bus P + 1
```

C-SH

If C-SH=1, the bus F 27a is shifted one position to the left, the vacant bit being replaced by ZERO.

The result is placed on the buses P 29 and N 28.

If C-SH=0, the bus F is directly connected to the buses P 29 and N 28.

C-WN

If C-WN=1, the content of the bus N 28 is transferred to the register of the stack 24 selected by the address NADD3-0.

If C-WN=0, the content of the register of the stack 24 selected by the address NADD3-0 is transferred to the bus N 28.

C-WP

If C-WP=1, the content of the bus P 29 is transferred to the register of the stack 25 selected by the address PADD3-0.

If C-WP=0, the content of the register of the stack 25 selected by the address PADD3-0 is transferred to the bus P 29.

C-CL

If C-CL=1, the flip-flop 32 generating SGN is reset to ZERO. The bit of CROM C-DRC is transferred to the flip-flop 33 generating DRC and the direction counter DIR 36 is incremented.

C-SGN

If C-SGN=1, the EXCLUSIVE OR (constituted by the output signal of the gate 31) between the signal generated by the last operation of the ALU 27 of the address processor 20 and the signal DRC of the flip-flop 33 is loaded into the flip-flop 32 generating SGN.

C-DRC

The value of C-DRC is loaded into the flip-flop 33 generating DRC when C-CL=1.

C-ENFC

If C-ENFC=1, the logic circuit 35 of "second plane" cycle generates the end of the cycle signal.

C-PALU3-0

The bits PALU3 to PALU0 select the code of operation of the ALU 47 of the point processor 21.

In the following, Bus XS and Bus XE respectively designate the data present on the Buses XS and XE 21A and 21B connecting the point matrix 21 with the ALU 47:

```
If PALU3-0 = 0000 Bus XS = bus data
            0001 Bus XS = bus 0
            0010 Bus XS = bus 1
            0011 Bus XS = inverse bus XE
            0100 Bus XS = OR between bus data and bus XE
            0101 Bus XS = AND between bus data and bus XE
            0110
            1111
```

C-XD

If C-XD=1, the Bus X of the point processor 21 is transferred to the data bus.

C-DX

If C-DX=1, the data bus is transferred to the bus X of the point processor 21.

C-YD

If C-YD=1, the bus Y of the point processor 21 is transferred to the data bus.

C-DY

If C-DY=1, the data bus is transferred to the bus Y of the point processor 21.

C-SY

If C-SY=1, the counter 40 of addresses ADY increments for each clock signal C-HY.

If C-SY=0, the counter 40 of addresses ADY decrements for each clock signal C-HY.

C-HY

If C-HY=1, the counter 40 of addresses ADY changes in the direction determined by C-SY.

C-MY2-0

The bits C-MY2-0 control the terminals of the evolution of the counter ADY 40.

If C-MY2=0, the signal EQPP=1 is generated if the state of the counter ADY 40 is equal to NP-1 (number of planes-1).

If C-MY2=1, the signal EQPP=1 is generated if the state of the counter ADY 40 is equal to zero.

If C-MY1-0=00, the counter ADY 40 is initialized with the zero value.

If C-MY1-0=01, the counter ADY 40 is initialized with the value NP-1.

If C-MY1-0=10, the counter ADY 40 is initialized with the content of the counter ADX 43.

C-SX

If C-SX=1, the counter 43 of addresses ADX increments for each clock signal C-HX.

If C-SX=0, the counter 43 of addresses ADX decrements for each clock signal C-HX.

C-HX

If C-HX=1, the counter 43 of addresses ADX changes in the direction determined by C-SX.

C-SRAM

If C-SRAM=1, the screen memory 53 is connected to the data bus and the content of the memory is selected at the address generated on the address bus by the interface circuit 52.

C-WRAM

If C-WRAM=1, the image memory writing cycle is selected. The content of the data bus is transferred to the selected address of the screen memory 53.

If C-WRAM=0, the memory reading cycle is selected. The content of the screen memory 53 selected at the corresponding address is transferred to the data bus.

C-WMAT

If C-WMAT=1, the writing cycle in the matrix of the point processor 21 is selected. The content of the data bus is transferred to the address of the matrix selected by one of the address counters ADX 43 or ADY 40.

If C-WRAM=0, the matrix reading cycle is selected. The content of the matrix 21 selected at the corresponding address is transferred to the data bus.

C-XYMAT

C-XYMAT=1 selects the access to the matrix of the point processor 21 through the channel X. C-XYMAT=0 selects the access to the matrix through the channel Y.

C-RCR

If C-RCR=1, the content of the color register 50 is transferred to the data bus.

Figure 10:
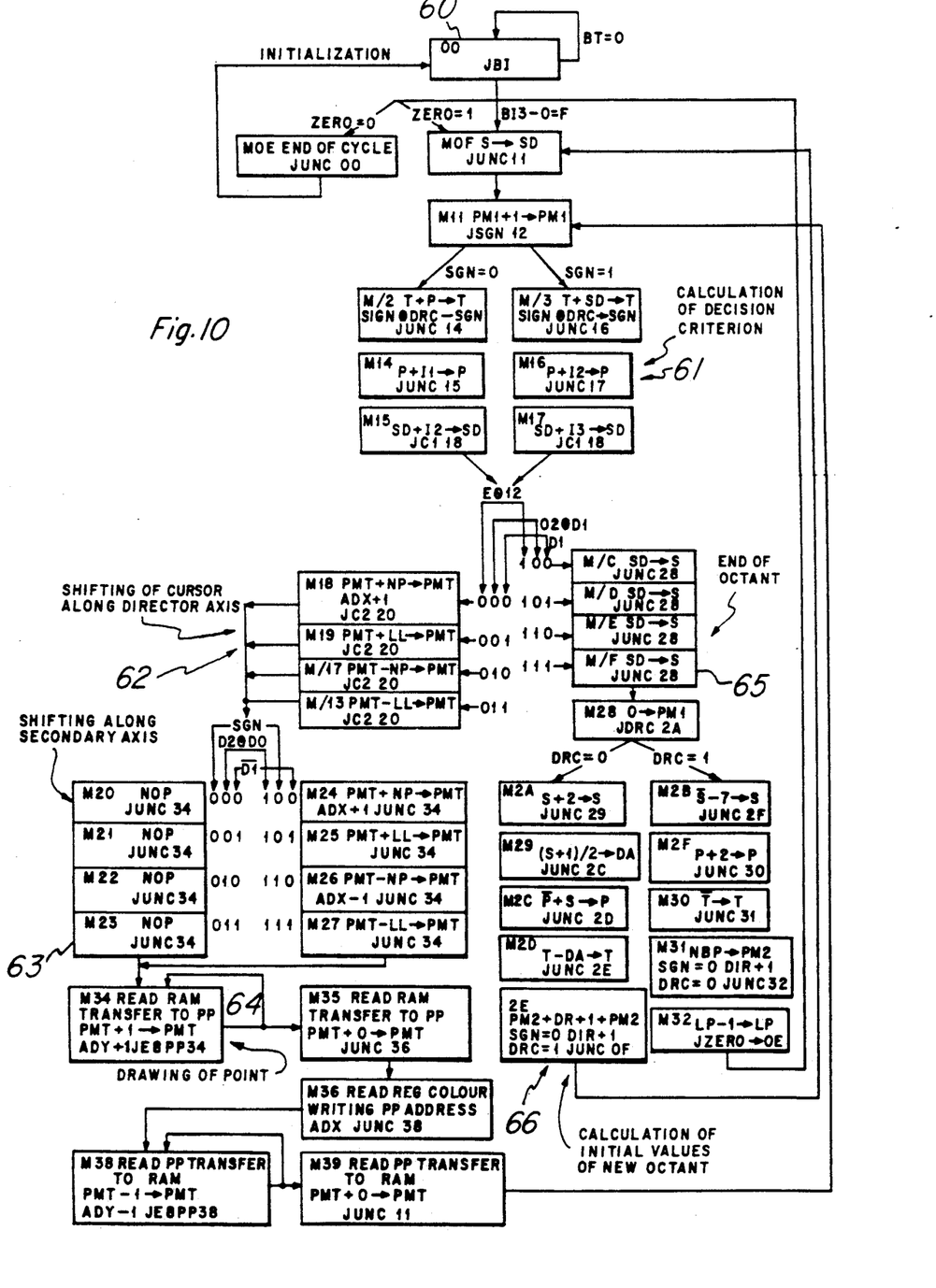
FIG. 10 is a flow chart of a circle drawing procedure for the device shown in FIG. 9.
Figure 11:
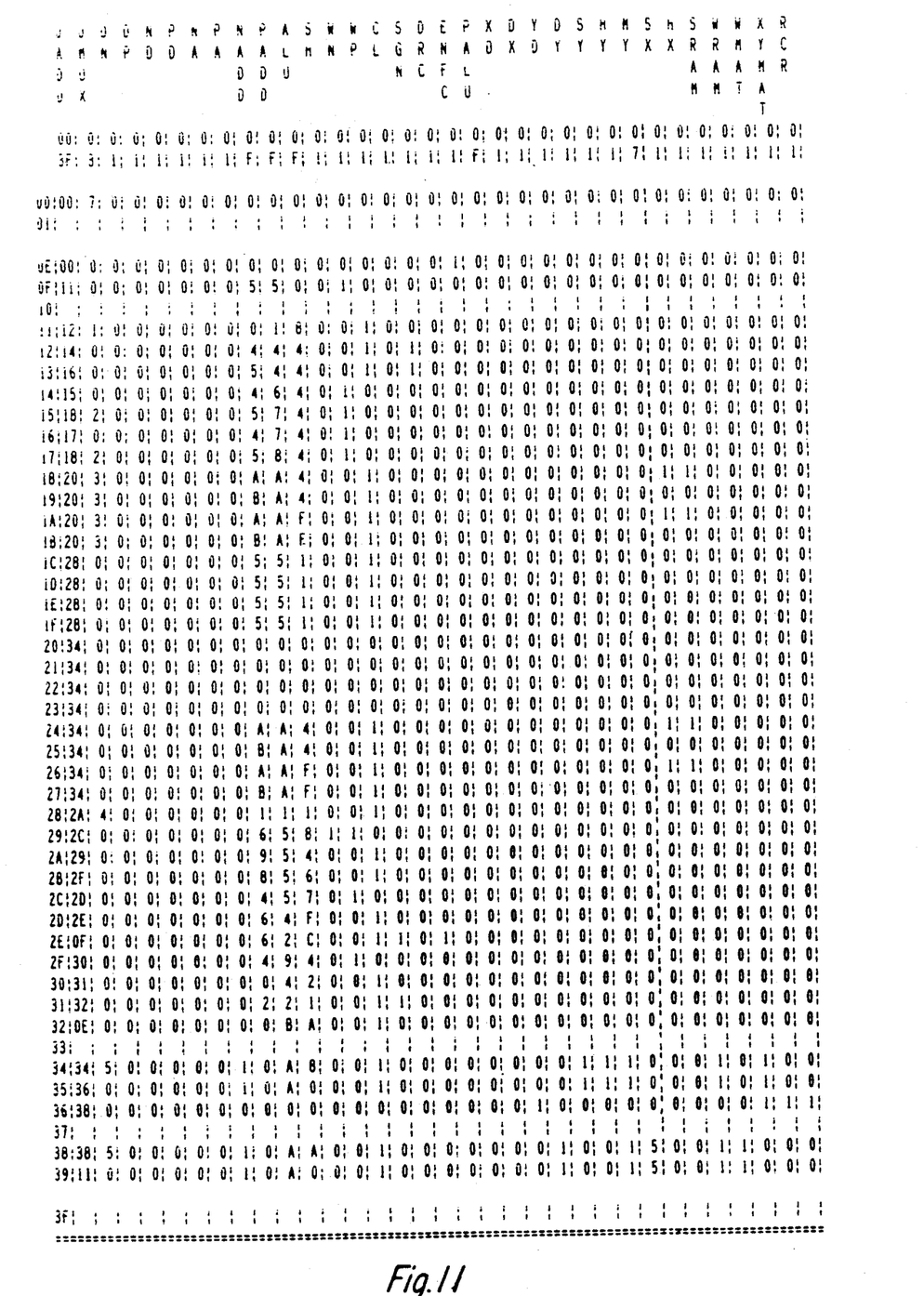
FIG. 11 represents the content of the microcode memory of the device shown in FIG. 9.

A circle is drawn by means of the device of FIG. 9 by effecting the procedure represented in FIG. 10 in accordance with the content of the CROM 22 represented in FIG. 11.

Each line of the CROM 22 contains a microcode to be effected while each column designates a bit of microcode available on an output corresponding to the CROM 22.

First of all, the initialization of the system is ensured by setting to zero the registers 24 and 25 of the address processor 20 and the flip-flops 32, 33.

This operation is carried out in the course of step 60 of the flowchart of FIG. 10.

There is then effected the drawing of an arc of a circle contained in an octant of FIG. 6.

For this purpose, the decision criterion is calculated in the course of all the steps as generally designated at 61.

Then, in the course of steps 62, the cursor is shifted along the director U axis from the origin of the curve.

In the course of the set 63 of the following steps, the cursor is conditionally displaced along the secondary V axis of the considered octant.

In the course of the group of steps 64, the point obtained in the screen memory 53 is drawn.

In the course of the steps designated generally at 65, the calculations of the octant end are effected.

In the course of steps 66, the initial values for the drawing of the arc of a circle contained in the following octant are calculated.

The end of the process test is effected.

The registers 24 and 25 of the address processor 20 are initialized by means of the procedure shown in the flow chart of FIG. 10 which is described in the case of the drawing of a complete circle and which employs a single instruction termed "second plane".

The parameters of the circle to be drawn are programmed before effecting the drawing in the "first plane" mode.

The modes of operation termed "first plane" and "second plane" are defined in French patent 84 10377 of which the Applicant is the proprietor and having for title "Process and system for displaying visual data on a screen by line and point-by-point scanning of video frames".

For drawing the circle, the following parameters are loaded into the registers 24 and 25.

Register 25 also termed stack P of registers.

| | | |
|---|---|---|
| 0 | | |
| 1 | PM1 = | 0 |
| 2 | PM2 = | number of points to be drawn during an octant |
| 3 | | |
| 4 | T = | radius of the circle in number of points |
| 5 | S = | (R × 2) − 3 |
| 6 | I1 = | −2 |
| 7 | I2 = | −2 |
| 8 | I3 = | −4 |
| 9 | = | −2 |
| A | PMT = | address of the first point of the circle |
| B | LP = | number of quadrants to be drawn (four quadrants for a complete circle) |
| C | | |
| D | | |
| E | | |
| F | | |

Register 24 also termed stack N.

| | | |
|---|---|---|
| 0 | | |
| 1 | = | 0 |
| 2 | NBP = | number of points to be drawn during an octant |
| 3 | | |
| 4 | P = | −1 |
| 5 | SD | |
| 6 | DA | |
| 7 | | |
| 8 | = | −7 |
| 9 | = | −2 |
| A | NP = | number of planes (increment for a horizontal displacement) |
| B | LL = | length of the line (increment for a vertical displacement)) |
| C | | |
| D | | |
| E | | |
| F | | |

The loading of the register BI 34 is then started.

The register BI 34 is loaded with the code corresponding to the drawing of the circle.

The logic circuit 35 for effecting the "second plane" cycle generates a cycle demand transmitted to a device DMA 51 of dynamic access to the memory (not shown) associated with the register stacks 24 and 25.

The direction counter DIR 36 is loaded with the number of of the octant to be drawn first of all.

The value loaded into the register BI 34 is the following:

```
+-----+-----+----- +-//-+-----+-----+-----+-----+
                DIR − 1 ! ! 1 1 1 1
+-----+-----+----- +-//-+-----+-----+-----+-----+
```

The input point in the CROM memory 22 is then determined.

Before loading the register BI 34, the address of the CROM 22 is equal to zero.

As the content of the register BI 34 is also equal to zero, the jump mode JBI maintains the address of the next microcode to be effected at 00 (FIGS. 10 and 11).

When the register BI 34 is loaded, the bits BI3 to BI0 are at 1 and the next microcode to be effected is at the address 0F.

In the course of effecting the microcode 0F, there is a transfer from the register S of the register stack P 25 to the register SD of the register stack N 24 (FIG. 9).

The content of the register S selected by the address PADD=5 is transferred to the register SD at the address NADD=5.

The value S is placed on the bus P 29 since WP=0 selects the mode of reading the register stack P 25 of the address processor 20.

The operation carried out by the circuit ALU 27 is C-ALU3-0=0. The content of the bus P 29 is transferred to the bus F 27a and then to the bus N 28.

As the signal WN of validation of the register stack N 24 is equal to 1, the content of the bus N 28 is transferred to the register SD of the register stack N 24. JMUX=0 selects the jump mode JUNC, and the next microcode to be effected is at the address M11.

Effecting the microcode M11 comprises:
the incrementing of the pointer PM1=PM+1
the test of SGN.

At the beginning of the effecting of the microcode, the content of the register PM1 of the register stack P 25 selected by PADD=1 is placed on the bus P 29. The incrementing of the register PM1 is effected by the arithmetic and logic unit ALU 27 upon an operation C-ALU=8 which corresponds to the operation F=P+1 and the result is transferred to the bus P 29, then written at the same address since WP=1 selects the writing in the register stack P 25.

The jump mode JSGN to the base address 12 permits effecting the next microcode at the address 12 if SGN=0 or at the address M13 if SGN=1.

The effecting of the microcodes M12, M14 and M15 will now be described.

During the effecting of the microcode M11 if SGN=0, the microcodes M12, M14 and M15 are effected in the order according to the previously-described procedure.

| Microcode M12 | T + Pn → T |
| | Positioning of SGN as a function of the sign of T and DRC |
| | JUNC at the microcode M14 |
| Microcode M14 | P + I1 → P |
| | JUNC at the microcode M15 |
| Microcode M15 | SD − I2 → SD |
| | JC1 at base address 18 |

During the effecting of the microcode M12, the registers P and T are selected in the stack N 24 and the stack P 25 by the addresses NADD=4 and PADD=4. F=P+N is selected by the operation ALU=4. As WP is at 1, the result is placed in the stack P 25 at the address PADD=4. The sign of the operation T=T+P which is generated by the ALU 27 is combined by the EXCLUSIVE OR gate 31 with DRC=0 issuing from the flip-flop 33, and the result is loaded into the flip-flop 32 by the signal C-SGN=1 issuing from the CROM 22. This new sign will be used during the next iteration.

During the microcode M14, according to the same procedure, the register P of the stack N 24 is incremented by the value I1 and the result is placed in the register P.

During the microcode M15, SD is incremented by the value I3.

The microcodes M13, M16 and M17 are effected as follows.

During the effecting of the microcode M11, if SGN=1, the microcodes M13, M16 and M17 are effected in the order in accordance with the same procedure as that previously described.

| Microcode M13 | T + SF → T |
| | Positioning of SGN as a function of the sign of T and DRC |
| | JUNC at the microcode M16 |
| Microcode M16 | P + I2 → P |
| | JUNC at the microcode M17 |
| Microcode M17 | SD − I3 → SD |
| | JC1 at base address 18 |

The effecting of a microcode M18 at M1F is achieved as follows.

The series of microcodes M12, M14 and M15 or M13, M16 and M17 have permitted the calculation of the decision criterion which is employed for shifting the cursor. The cursor must now be shifted along the director U axis if the complete octant has not been drawn, i.e. if the register PM1 is not equal to the register PM2. In the case of equality between registers PM1 and PM2, there is a change of octant and it will then be necessary to calculate the initial values for drawing the following octant from the final values of the octant in the process of being drawn.

During the effecting of the microcodes M15 and M17, the jump condition JC1 permits choosing according to the value of the signal EQ1.2 (13) the next microcode to be effected among two series M18, M19, M1A and M1B if EQ1.2=0 or M1C, M1D, M1E and M1F if there is equality between registers PM1 and PM2. In the latter case, one of the four microcodes is effected as a function of the selection by the signals D2, XOR, D1 and D1.

These four microcodes effect the same function:

Transfer of the content of register SD of the stack N 24 to the register S of the stack P 25.

JUNC at the address 28

If there is no equality, the drawing of the octant has not terminated and the cursor must be shifted along the director axis.

There are four possible cases according to the eight values of the drawing direction counter DIR 36.

| DIR D2 | D1 | D0 | D2 XOR D1 | D1 | INCRE-MENT | Ad microcode |
|---|---|---|---|---|---|---|
| 0 | 0 | 0 | 0 | 0 | Dx+ | 18 |
| 0 | 0 | 1 | 0 | 0 | Dx+ | 18 |
| 0 | 1 | 0 | 1 | 1 | Dy− | 1B |
| 0 | 1 | 1 | 1 | 1 | Dy− | 1B |
| 1 | 0 | 0 | 1 | 0 | Dx− | 1A |
| 1 | 0 | 1 | 1 | 0 | Dx− | 1A |
| 1 | 1 | 0 | 0 | 1 | Dy+ | 19 |
| 1 | 1 | 1 | 0 | 1 | Dy+ | 19 |

The microcode M18 is effected as follows:

The pointer is incremented along the X axis. The counter ADX 43 is incremented by the signal C−HX=1 in the positive direction selected by C−SX=1. The counter ADX 43 generates a signal EQPI=1 if the word overflows, i.e. if ADX changes the value F to zero. The pointer PMT is incremented in the address processor 20 by the operation PMT+NP only if EQPI=1 which validates the writing signal WP=1 in the stack P 25 which corresponds to a shifting to the right of the screen.

The microcode M1A is effected as follows.

The operation is similar to that described in connection with the microcode M18, but the pointer is decremented along the X axis. The counter ADX 43 is decremented (C−SX=0) and PMT=PMT−NP if EQPI=1, which corresponds to a shifting toward the left of the screen.

The microcode M19 is effected as follows.

The pointer is incremented along the Y axis. PMT is incremented in the address processor 20 by the operation PMT=PMT+LL which corresponds to a vertical shifting toward the bottom of the screen.

The microcode M1B is effected as follows.

The pointer is decremented along the Y axis. PMT is decremented in the address processor 20 by the operation PMT=PMT−LL which corresponds to a vertical shifting toward the top of the screen.

The effecting of the microcodes M20 to M28 will now be described.

After the systematic shifting of the cursor along one of the X or Y axes, the conditional shifting along the opposite axis in one of the four directions must be effected. The jump condition JC2 of the microcodes M18, M19, M1A and M1B permits the effecting of this shifting only if SGN=1 by effecting one of the microcodes M24, M25, M26 or M27, which is selected by the signals D2, D1 and D0 issuing from the direction counter DIR 36. In the case where SGN=0, there is no shifting of the cursor and one of the four microcodes M20, M21, M22 or M23 is effected according to the value of D2 and D1. These four microcodes contain only one unconditional jump to the microcode M34.

If SGN=1, one of the four microcodes M24, M25, M26 or M27 is effected as a function of the selection by the signals D2, X0R, D0 and complemented D1.

There are four possible cases according to the eight values of the drawing direction counter DIR 36.

| DIR | D2 | D1 | D0 | D2 XOR D1 | D1 | INCRE-MENT | ad microcode |
|-----|----|----|----|-----------|----|-----------|--------------|
| 0 | 0 | 0 | | 0 | 1 | Dy+ | 25 |
| 0 | 0 | 1 | | 1 | 1 | Dy− | 27 |
| 0 | 1 | 0 | | 0 | 0 | Dx+ | 24 |
| 0 | 1 | 1 | | 1 | 0 | Dx− | 26 |
| 1 | 0 | 0 | | 1 | 1 | Dy− | 27 |
| 1 | 0 | 1 | | 0 | 1 | Dy+ | 25 |
| 1 | 1 | 0 | | 1 | 0 | Dx− | 26 |
| 1 | 1 | 1 | | 0 | 0 | Dx+ | 24 |

The effecting of the microcode M24 is identical to that of the microcode M18.

The effecting of the microcode M25 is identical to that of the microcode M19.

The effecting of the microcode M26 is identical to that of the microcode M1A.

The effecting of the microcode M27 is identical to that of the microcode M1B.

The next microcode is selected by an unconditional jump to the address 34.

The effecting of the microcodes of the branch M34 will now be described.

After the shifting of the cursors and of the address counter ADX 43 of the point processor, the point must be drawn in the screen memory 53. It is necessary to read the N words corresponding to the number of planes NP, to modify the color of the point selected in the matrix 21 by the address ADX and re-transfer the result in the screen memory 53 to the same addresses.

The microcodes M34 and M35 transfer the words located at the addresses PMT to PMT+NP−1 in the matrix 21 respectively to the addresses ADY=0 to ADY=NP−1.

The microcode M36 modifies the color of the point located at the address ADX, the new color being stored in the color register 50 which is validated on the bus, given by C−CRC=1, transferred on the bus XS by the function PALU=0, then written in the matrix 21 through the channel X (C−WMAT=1 and XYMAT=1).

The microcodes M38 and M39 effect the inverse transfer operation of the matrix 21 in the memory. The address ADY changes upon each transfer from NP−1 to zero while the writing address in the memory changes from PMT+NP−1 to PMT.

At the end of this procedure, the new point is drawn in the same way by again beginning the procedure starting with the effecting of the microcode M11.

The effecting of the microcodes of the branch M28 will now be described.

In the case of the branch M28, the last point of the octant has been drawn. Now the procedure is concerned with calculating the initial values contained in the various registers of the address processor 20 for drawing the following octant without intervention of the central unit for reprogramming these registers.

Two cases are possible depending on the value of DRC, 28, 2A, 29, 2C, 2D and 2E if DRC=0 or 28, 2B, 2F, 30, 31, 32 if DRC=1.

Case DRC=0.

The initial values of P, T, S, PM2 and PM1 are obtained from the current values by the following equations:

$PM1 = 0$ $S = S + 2$ $DA = S + \frac{1}{2}$ $P = \text{compl. } P + S$ $T = T - DA$ $PM2 = PM2 + DA + 1$ $SGN = 0$ $DIR = DIR + 1$ $DRC = 1$ The microcode M28 is effected in the following manner.

The microcode M28 is common to the two branches M2A and M2B. It resets to zero the register PM1 of the stack P 25 which changes from 0 to PM2 during the drawing of an octant. NADD=1, PADD=1, ALU=1 (F=N). The value 0 contained in the register 1 of the stack N 24 is transferred at the output of ALU 27, the signal WP being at 1. The result of the ALU 27 is transferred to the register T of the stack P 25 at the address 1.

The jump condition JDRC permits the connection to the microcode M2A if DRC=0 or M2B if DRC1=1.

Effecting the microcode M2A permits effecting the function S=S+2, PADD=5, NADD=9, ALU=6 (F=P+N), WP=1. The result of the operation carried out in the register P and in the register N is transferred in the register P.

When this has been effected, there is an unconditional connection to the microcode M29.

Effecting the microcode M29 permits effecting the function DA=S=½. NADD=6, PADD=5, ALU=8 (F=P+1), WN, C−SH=1. The result of the operation in the register S+1 is shifted to bit to the left, which effects the division by 2. The result is placed in the register DA of the stack N 24.

When this has been effected, there is an unconditional connection to the microcode M2C.

The microcode M2C is effected as follows.

The operation P=complement of P+S is equivalent to P=S−P−1. The microcode values are the following: NADD=4, PADD=5, ALU=7 (F=inverse N+P) WN.

When this has been effected, there is an unconditional connection to the microcode M2D.

The microcode M2D is effected as follows.

The operation T=T−DA is equivalent to T+compl. DA+1, NADD=6, PADD=4, ALU=F (F=inverse N+P+1), WP. The result of the operation is placed in the register T of the stack P 25.

When this has been effected, there is an unconditional connection to the microcode M2E.

Effecting the microcode M2E permits effecting the following operation PM2=PM2+DA+1, NADD=6, PASS=1, ALU=C (F=P+N+1), WP. The flip-flop 32 is reset to zero by the bit C−CL=1 which increments also the direction counter DIR 36 of direction DIR=DIR+1 and positions the flip-flop 33 at DRC=1.

At the next passage to the microcode M28, JDRC will choose the branch M2B which effects a different series of operations corresponding to the start of an even octant.

Case DRC=1.

The initial values of P, T, S, PM2 and PM1 are obtained from the current values by the following equations:

PM1=0

S=compl. S−7

P=P+2

T=compl. T

PM2=NBP

SGN=0

DIR=DIR+1

DRC=0

The effecting of the microcodes in the branch M2B is similar to the preceding case. It permits initializing the registers in the case of the start of an even octant. The last microcode of the branch (M32) tests whether the eight octants of the circles have been drawn. After decrementing the register LP of the stack P 25, the condition JZERO OE permits effecting the microcode of the end of the cycle OE which resets to zero the logic circuit 35 of the second plane cycle or continuing to effect the procedure at the address OF.

We claim:

1. A drawing device for carrying out a process for graphically drawing point by point at least one arc of a closed curve of the second order, wherein the plane intended to contain the curve to be drawn is divided into octants, said drawing device comprising:
   screen memory means for storing data relating to the points on a display screen defining the plane on which the closed curve of the second order is to be drawn;
   point processor means operably coupled to said screen memory means for modifying the data stored in said screen memory means at locations therein corresponding to the points of the curve to be drawn on the display screen;
   address processor means operably coupled to said screen memory means and to said point processor means for controlling access to said screen memory means and processing point data in providing the calculations necessary to accomplish an iterative point by point drawing on the display screen, said address processor means controlling the operation of said point processor means and data transfer between said point processor means and said screen memory means in the modification of the data stored in said screen memory means as a function of the curve to be drawn; and
   memory means operably coupled to said point processor means and to said address processor means for respectively controlling the operation thereof, said CROM memory means having instructions stored therein relating to successive changes of a reference of relative coordinates provided by director and secondary axes U,V upon successive changes in octants as the arc of the curve is drawn on the display screen and instructions relating to the iterative point by point drawing of the arc of the curve as contained in each successive octant covered by the arc of the curve to be drawn.

2. A drawing device as set forth in claim 1, further comprising:
   an address multiplexer operably coupled to said CROM memory means;
   an instruction register connected to said address multiplexer for receiving and transferring to said CROM memory means via said address multiplexer instructions relating to a curve to be drawn; and
   a direction counter of the direction of the curve drawn in the respective octants covered by the curve to be drawn, said direction counter being connected to said instruction register and being controlled by the octant changing instructions contained in said CROM memory means.

3. A drawing device as set forth in claim 1, wherein said address processor means includes a plurality of registers in which data is stored for controlling access to said screen memory means and for processing point data, and further comprising:
   means for determining the sign of the slope of the tangent to the curve at the point of origin of the arc of a curve to be drawn in each octant;
   means for controlling the octant change; and
   an arithmetic and logic unit;
   said means for determining the sign and said means for controlling the octant change being operably associated with said arithmetic and logic unit for processing the content of the registers of said address processor means as a function of the instructions of the CROM memory means.

4. A drawing device as set forth in claim 3, wherein said point processor means includes a matrix of a plurality of storage cells in which point data is stored and accessible along axes X,Y, and further comprising:
   means for controlling data access to the point processor means in two directions controlled by said CROM memory means for introducing in the storage cells of said point processor means, point data relating to the modification of the data of the screen memory means as a function of the curve to be drawn; and
   an arithmetic and logic unit also controlled by the CROM memory means for effecting on the data introduced in the matrix of storage cells of the point processor means, the operations required for modifying the data of the screen memory means for the purpose of the transfer to the corresponding locations of the screen memory means data modified as a function of the curve to be drawn.

5. A drawing device as set forth in claim 4, further comprising:
   a color register for associating with each point of the curve to be drawn as introduced in the screen memory means, after processing by the point processor means, color modifying data for permitting the operations for the display of the curve from the content of said screen memory means to be modified in accordance with the curve to be drawn.

6. A drawing device as set forth in claim 5, further comprising:

means for determining the sign of a decision criterion in the drawing of the arc of the curve and for adapting the decision criterion as a function of the drawing octant to obtain a perfectly symmetrical curve.

* * * * *